Sept. 13, 1932. J. BERGE 1,876,836
HELICAL LOCK WASHER FOR STRAIGHT COUNTERBORES
Filed Aug. 12, 1931
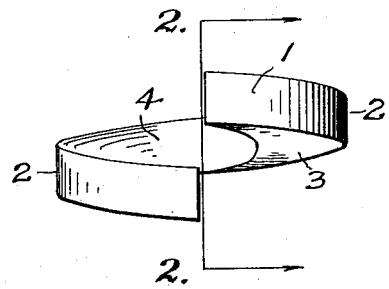
Fig. 1
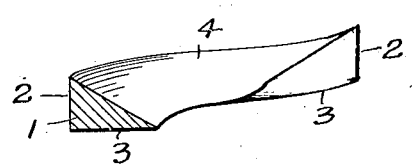
Fig. 2
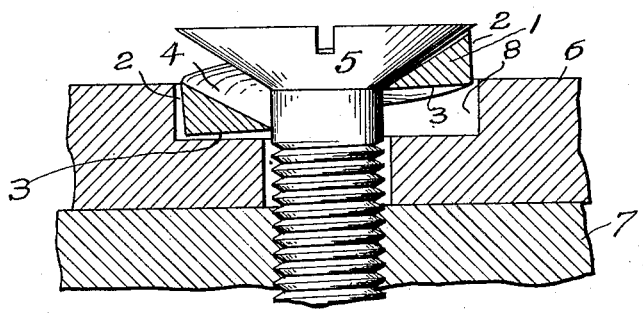
Fig. 3
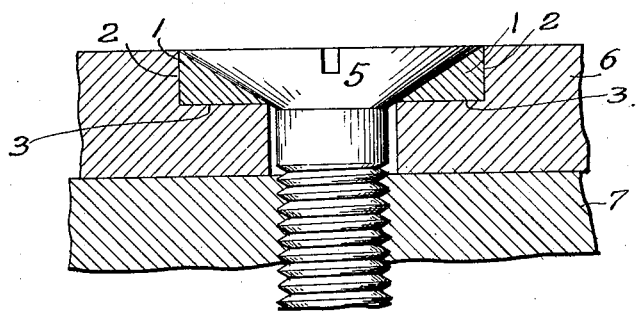
Fig. 4
Inventor
Joseph Berge
by
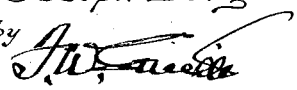
Attorney Patented Sept. 13, 1932

1,876,836

UNITED STATES PATENT OFFICE

JOSEPH BERGE, OF MONTCLAIR, NEW JERSEY, ASSIGNOR TO NATIONAL LOCK WASHER COMPANY, OF NEWARK, NEW JERSEY, A CORPORATION OF NEW JERSEY

HELICAL LOCK WASHER FOR STRAIGHT COUNTERBORES

Application filed August 12, 1931. Serial No. 556,678.

This invention relates to lock washers of the helical segment type, and has for its object to provide such a washer as will, when compressed, fit within a straight counterbore and will be so formed as to receive the beveled head of a screw, the driving of which will compress the washer and greatly increase the resistance of the latter by causing it to impinge against the side wall of the counterbore thereby preventing the spreading of the washer during the final driving of the screw.

When the washer is fully compressed, it as well as the screw will be flush with the surface that is counterbored if flat head screws are employed, but oval head screws may be used, if desired.

In the accompanying drawing which is to be read in connection with the description that follows, Figure 1 is a side elevation of the washer—

Figure 2 is a section at the line 2—2 of Figure 1—

Figure 3 is a sectional elevation showing all the parts as they appear when assembled preparatory to driving the screw, and Figure 4 is a view similar to Figure 3, but showing the position of parts when the screw is fully driven.

Similar numerals of reference will be used to denote like parts in the several figures of the drawing.

1 denotes the lock washer generally whose outside edge 2 is at right angles to the lower face 3, and whose upper face 4 inclines or dishes inward so as to be properly contacted by the beveled screw 5. In the preferred form of this washer, the incline 4 extends from the top to the bottom of the washer so that the latter is triangular in cross section as shown.

6 represents any suitable strip or part that is to be secured to another part 7, the parts being bored as usual to accommodate the screw, the bore in the part 7 being threaded.

8 is a straight counterbore formed in the part 6, and in assembling the screw and washer, the latter is positioned within the counterbore and the screw passed through the bore in said part and then driven into the threaded bore of the part 7.

The edge 2 of the washer is substantially parallel to the side wall of the counterbore, so that it will be clear that said edge will contact said wall as the screw is driven and will therefore prevent the spreading of the washer and greatly increase the resistance as the screw is finally driven against the dished face 4 to cause the bottom face of the washer to seat against the floor of the counterbore.

It will thus be noted that the washer will exert both a lateral and an upward force against the bevel of the screw and will thereby prevent any relaxation of the latter.

While machine screws are shown in the drawing it will be manifest that wooden screws may be employed, this largely depending on the parts to be secured together.

What is claimed is:—

1. In combination, a body provided with a straight counterbore, a screw with a beveled head, and a spring washer in the form of a helical segment triangular in cross section disposed in said counterbore, said washer having an inclined face adapted to contact with said beveled head.

2. A construction as in claim 1 further distinguished in that the outer edge of the washer is straight and at right angles to the lower edge which latter in compressed form rests upon the bottom of the counterbore.

3. A construction as in claim 1 with the addition that the outer edge of the washer is substantially parallel to the side of the counterbore, while the upper face of the washer is dished at an angle that generally corresponds to the angle of the beveled head of the screw.

In testimony whereof I affix my signature hereto.

JOSEPH BERGE.